United States Patent
Celentano et al.

(10) Patent No.: US 9,608,325 B2
(45) Date of Patent: Mar. 28, 2017

(54) DYNAMIC RESOURCE ALLOCATION IN A MULTI-ROLE OR MULTI-FUNCTION SYSTEM

(75) Inventors: Salvatore Celentano, Rome (IT); Francesca Donati, Rome (IT); Sergio Pardini, Rome (IT)

(73) Assignee: Selex ES S.p.A. (IT)

( * ) Notice: Subject to any disclaimer, the term of this patent is extended or adjusted under 35 U.S.C. 154(b) by 879 days.

(21) Appl. No.: 13/989,036

(22) PCT Filed: Nov. 22, 2011

(86) PCT No.: PCT/IB2011/055241
§ 371 (c)(1),
(2), (4) Date: Aug. 1, 2013

(87) PCT Pub. No.: WO2012/069994
PCT Pub. Date: May 31, 2012

(65) Prior Publication Data
US 2013/0300605 A1    Nov. 14, 2013

(30) Foreign Application Priority Data
Nov. 22, 2010  (IT) .............................. TO2010A0925

(51) Int. Cl.
H01Q 3/00    (2006.01)
H01Q 3/30    (2006.01)
G01S 13/02   (2006.01)

(52) U.S. Cl.
CPC ........ *H01Q 3/30* (2013.01); *G01S 2013/0254* (2013.01); *G01S 2013/0272* (2013.01)

(58) Field of Classification Search
USPC .................. 342/59, 157, 173, 200, 368, 372
See application file for complete search history.

(56) References Cited

U.S. PATENT DOCUMENTS 7,423,578 B1    9/2008  Tietjen

OTHER PUBLICATIONS

Holloway, J., "Design Considerations for Adaptive Active Phased-Array 'Multifunction' Radars," Electronics and Communication Engineering Journal, Institution of Electrical Engineers, London, GB, vol. 13, No. 6, Dec. 1, 2001 (Dec. 1, 2001), pp. 277-288.
Miranda, S., et al., "Knowledge-Based Resource Management for Multifunction Radar: A Look at Scheduling and Task Prioritization," IEEE Signal Processing Magazine, IEEE Service Center, Piscatawa, NJ, US, vol. 23, No. 1, Jan. 1, 2006, (Jan. 1, 2006), pp. 66-76.

(Continued)

*Primary Examiner* — Dao Phan
(74) *Attorney, Agent, or Firm* — The Belles Group, P.C.

(57) ABSTRACT

A multi-role or multi-function system operable to perform a multi-role or a multi-function and configured to dynamically allocate requisite resources for performing antenna functions during a frame interval of the multi-role or the multi-function by determining whether the antenna functions are completely performable in the frame interval, based on a time-sharing resource allocation procedure; and if not, allocating the requisite resources for performing the antenna functions during the frame interval, based on a time-sharing resource allocation procedure and an antenna-sharing resource allocation procedure.

20 Claims, 6 Drawing Sheets

(56) References Cited

OTHER PUBLICATIONS

Izquiero-Fuente, A., et al., "Approach to Multifunction Radar Scheduling Simulation," Telesystems Conference, 1994., Conference Proceedings, 1994 IEEE Natio Nal San Diego, CA, USA, May 26-28, 1994, New York, NY, USA, IEEE, May 26, 1994 (May 26, 1994), pp. 67-70.
Winter et al., "On Scheduling a Multifunction Radar," Aerospace Science and Technology, Elsevier Masson, FR, vol. 11, No. 4, May 3, 2007 (May 3, 2007), pp. 289-294.
Ricardo Reinoso-Rondinel et al., "Task Prioritization on Phased-Array Radar Scheduler for Adaptive Weather Sensing," 34th Conference on Radar Meteorology, Jan. 1, 2009 (Jan. 1, 2009), pp. 1-15.

DYNAMIC RESOURCE ALLOCATION IN A MULTI-ROLE OR MULTI-FUNCTION SYSTEM

CROSS-REFERENCE TO RELATED PATENT APPLICATIONS

The present application is a U.S. national stage application under 35 U.S.C. §371 of PCT Application No. PCT/IB2011/055241, filed Nov. 22, 2011, Which claims priority to Italian Application No. TO2010A000925, filed Nov. 22, 2010, the entireties of which are incorporated herein by reference.

TECHNICAL FIELD OF THE INVENTION

The present invention relates to dynamic resource allocation in a multi-role or multi-function system, which is configured to perform one or more RADAR functions, and/or one or more communication functions, and/or one or more electronic-war functions, and/or other similar antenna functions, to which the ensuing treatment will make explicit reference without this implying any loss of generality.

PRIOR ART

As is known, some latest-generation multi-function systems comprise phased-array antenna systems, for example of the RADAR type, which are provided with one or more arrays of radiant elements and are configured in such a way as to be able to operate independently of one another in order to execute distinct antenna functions of the RADAR type.

A known multi-function system is the RADAR antenna system called EMPAR (European Multifunctional Phased-Array RADAR), which basically comprises a RADAR unit of a phased-array type, and an electronic control system, which is configured so as to cause the array of radiant elements of the RADAR unit to generate an electronic beam that performs an electronic scan that is able to execute, for example, multiple functions, referred to hereinafter by the term "multi-functions", such as for example air-surveillance functions, and/or target-tracking functions, and/or missile-guidance functions.

In the EMPAR system referred to above, the percentage of time to be dedicated to execution of the various RADAR functions is planned in the stage of design of the system itself on the basis of a series of pre-set surveillance constraints/requirements, such as, for example, the priority of execution of the RADAR function, the nominal execution time of the RADAR function, corresponding to the interval within which the RADAR function is to be completed and at the end of which the RADAR function itself is to be executed again, and a performance constraint corresponding to the "distance of coverage" of the electronic scan of the RADAR unit in the course of observation.

FIG. 1 shows a simplified example of planning of the time execution of two RADAR functions in the EMPAR system, where A is a first RADAR function of the multi-function, for example, a function of three-dimensional volume search having an effective duration of execution $t_{RA}$, B is a second RADAR function envisaged in the multi-function such as, for example, a function of horizontal search having an effective duration of execution $t_{RB}$, while $t_F$ is a multi-function interval or frame interval, which indicates an overall time within which the multi-function is to be executed and at the end of which the system re-iterates implementation of the multi-function itself. In the case in point, in the EMPAR system the effective times $t_{RA}$ and $t_{RB}$ and the frame interval $t_F$ are established in the design stage and consequently, given that they are pre-set, cannot be modified subsequently. In the design stage, the nominal execution times tni within which each RADAR function is to be executed are moreover established.

During operation, the EMPAR system uses the hardware/software resources necessary for execution of the RADAR functions A and B, i.e., the computational resources, the memory resources, the antenna resources, etc., on the basis of the time sequence envisaged by the planning, so that, during implementation of the RADAR function A, the EMPAR system will use in a complete and exclusive way the resources dedicated to execution of the RADAR function A for a percentage of time $t_{BA}/t_{nA}$ (where $t_{nA}$ is the nominal execution time within which the RADAR function A is to be executed) and subsequently, during implementation of the RADAR function B, the system will use in a complete and exclusive way the resources dedicated to execution of the RADAR function B for a pre-set percentage of time $t_{RB}/t_{nB}$ (where $t_{nB}$ is the nominal execution time within which the RADAR function B is to be executed).

Antenna resource allocation in the EMPAR system described above presents a substantially "static" architecture in so far as, in addition to being planned in the design stage and hence being not readily modifiable during the operating stage, it does not envisage that the system will share common resources during simultaneous execution of a number of RADAR functions, the latter being a condition that renders unsuitable the use of the modality of resource allocation described above to latest-generation antenna applications of a phased-array type having a high degree of complexity, such as for example the so-called "multi-role" phased-array systems.

In particular, multi-role phased-array systems are systems configured in such a way as to perform simultaneously one or more RADAR functions and/or one or more communication functions, and/or one or more electronic-war functions, and/or other similar antenna functions.

In the case in point, the multi-role phased-array systems must necessarily implement antenna functions of different types, on the one hand sharing the same hardware resources and on the other solving possible software conflicts during execution of antenna functions of different types.

From this there has arisen the need on the part of the present applicant to provide a multi-role or multi-function system configured in such a way as to perform dynamic allocation of the resources so as to share said resources during execution of the antenna functions in order to obtain an optimization of the hardware/software performance of the system itself.

Article written by Holloway John, entitled "Design consideration for adaptive active phased-array multifunction radar" (from page 277 to page 288 of magazine "Electronics and communication engineering Journal, institution of electrical engineers", London, GB, Vol. 13, no.) published on Dec. 1, 2001, discloses a phased-array radar comprising a time scheduler which is configured to determine the temporal sequence of a number of antenna functions in the time domain.

U.S. Pat. No. 7,423,578 B1 relates to a phased-array radar system comprising a plurality of radiating elements configured in a common array aperture for detecting and tracking targets; and a transmit and receive arrangement responsive to a first control signal for configuring the plurality of radiating elements to define a plurality of sub-apertures from the common array aperture for detecting and tracking short range targets, wherein the plurality of sub-apertures are independently steerable array apertures.

Izquierdo-Fuente's document entitled "Approach to multifunction radar scheduling simulation" relates to Telesystems conference, 1994, conference proceedings, 1994, IEEE NATIONAL San Diego, Calif., USA, May, 26-28 1994, and discloses a simulation system configured to evaluate the performance of scheduling algorithms. The simulation system performs a time scheduling procedure called "Pulse Packing", based on inter-connecting wave forms pulse of radar-search functions and tracking radar wave pulse, in time domain. Document written by Miranda S. ET AL having title "Knowledge-based resource management for multifunction radar: a look at scheduling and task prioritization" (contained from page 66 to page 76 of the magazine IEE SIGNAL PROCESSING, IEE SERVICE CENTER, PISCATAWAY, N.J., US, vol. 23. No. 1 published on Jan. 1, 2006, discloses in general way the technical problem of resources allocation, but it fails to indicate algorithms or device or method able to overcome/solve such problem.

Article written by Winter et and entitled "On scheduling a multifunction radar" (page 289 to page 294 of technical magazine "Aerospace Science and technology, Elsevier Masson, FR, vol. 11. no. 4, published on May 3, 2007), discloses a method for function time scheduling in time domain.

Article entitled "Task prioritization on phased-array radar scheduler for adaptive weatear sensing" relates to the 34th conference on radar meteorology held on Jan. 1, 2009, and discloses a number of general theories for allocating radar functions, such as tracking functions or surveillance functions in time domain.

Articles and documents cited above disclose temporal schedulers, which, as it is known, are configured to determine the temporal sequence order of antenna functions to be performed, but they fail to disclose any information about dynamic allocation of resources requested to perform such functions.

OBJECT AND SUMMARY OF THE INVENTION

The aim of the present invention is consequently to provide a multi-role or multi-function system configured to perform dynamic allocation of resources necessary for simultaneous execution of one or more RADAR functions, and/or one or more communication functions, and/or one or more electronic-war functions, or other similar antenna functions.

According to the present invention, a multi-role or multi-function system and method, and a computer program for dynamic resource allocation in a multi-role or multi-function phased-array system are provided, as defined in the annexed claims.

DETAILED DESCRIPTION OF PREFERRED EMBODIMENTS OF THE INVENTION

The present invention will now be described in detail with reference to the attached figures to enable a skilled person to implement it and use it. Various modifications to the embodiments described will be immediately evident to persons skilled in the sector, and the general principles described can be applied to other embodiments and applications without thereby departing from the sphere of protection of the present invention, as defined in the annexed claims. Consequently, the present invention is not to be considered as being limited to the embodiments described and illustrated, but it must be granted the widest sphere of protection in accordance with the principles and characteristics described and claimed herein.

The present invention is essentially based on the idea of allocating the resources of a multi-role or multi-function system by operating in a dynamic way on a number of different domains, such as, for example: the time domain; the space domain containing the set of the antenna apertures and/or of the portions of antenna aperture of the system; and, preferably, the frequency domain containing the set of the frequencies that may be assigned to the electromagnetic signals used by the antenna functions.

In particular, execution of the antenna functions can be determined according to a sequential temporal order determined dynamically through the solution of possible conflicts and/or execution performance constraints of the antenna functions in the time domain and, in the case where the conflicts and/or execution performance constraints of the antenna functions cannot be solved just in the time domain, allocating the resources necessary for execution of the antenna functions, to share functions not only in the time domain, but also in the space domain, and/or in the frequency domain.

More specifically, resource allocation is carried out by assigning to the antenna functions that share the same execution time interval respective portions of antenna aperture and corresponding operating frequencies.

Figure 1:
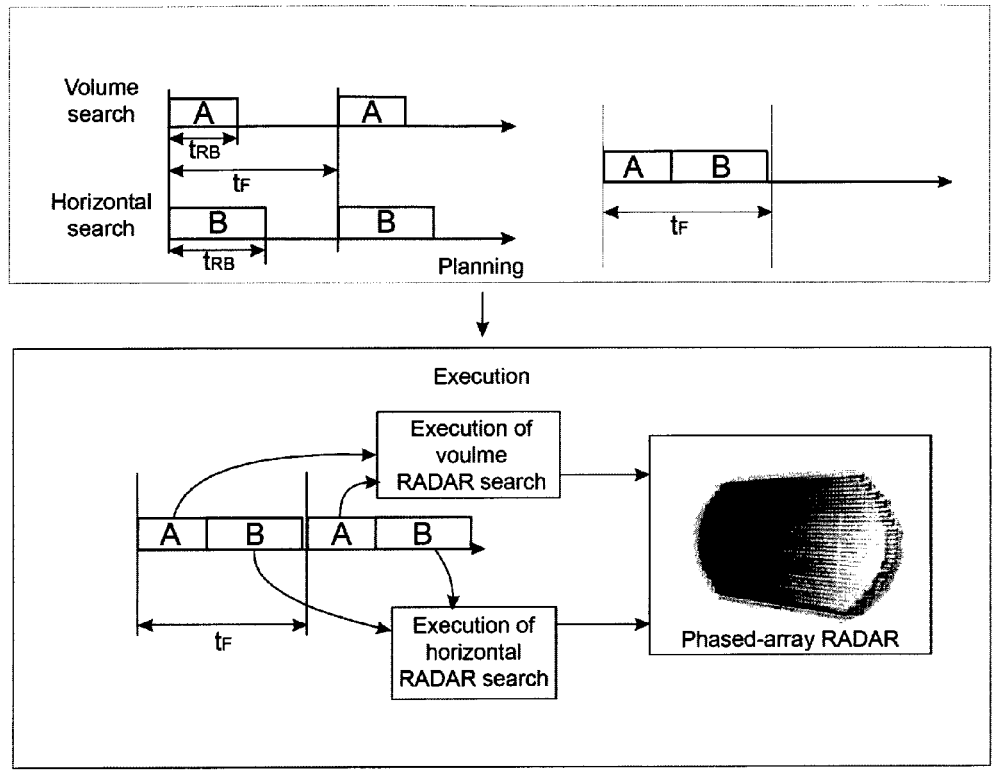
FIG. 1 is a schematic illustration of an example regarding an allocation of resources in a multi-function system of a known type.
Figure 2:
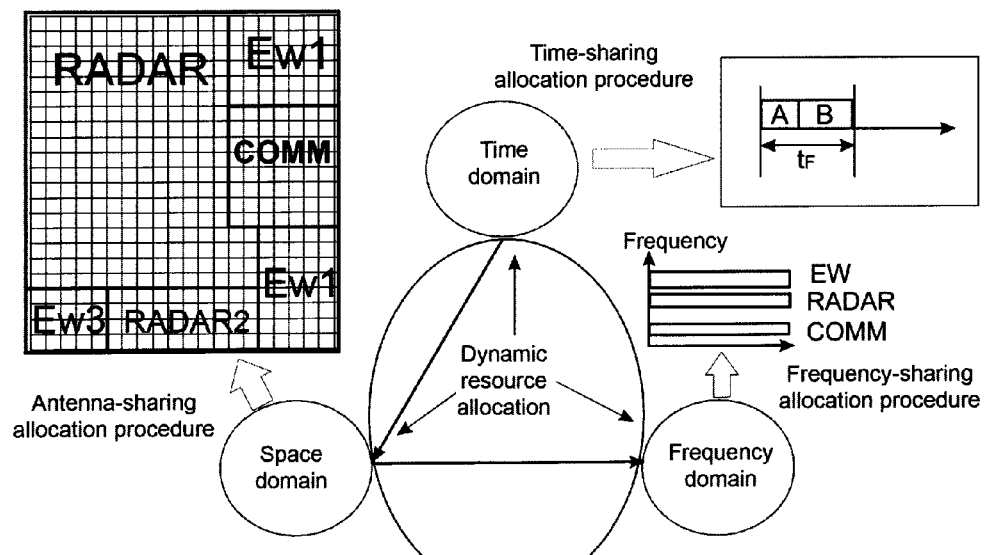
FIG. 2 shows a functional principle diagram of the operations of dynamic resource allocation implemented by the multi-role or multi-function phased-array system according to the present invention.

In the case in point, with reference to the functional diagram shown in FIG. 2, the allocation of resources necessary to perform antenna functions is carried out by implementing, in the initial step, a time-sharing resource allocation procedure, through which there is verified the possibility of executing the antenna functions in the time domain so as to prevent conveniently problems of mutual interference, at the same time guaranteeing maximum performance for each function.

When resource allocation is impossible in just the time domain, an antenna-sharing resource allocation procedure is performed, through which the antenna aperture is divided into a plurality of aperture or sub-aperture portions, each of which performs a corresponding antenna function different from the functions implemented by the other antenna portions.

Resource allocation further comprises a frequency-sharing resource allocation procedure, through which an allocation of the frequencies is made for the electromagnetic signals associated to the different apertures assigned to the antenna functions, in such a way as to satisfy a condition of minimum interference.

For a better understanding of the present invention, it should be pointed out that hereinafter, by the term "multi-function system" will be meant a system that is designed to plan and execute a series of antenna functions belonging to a given category of use of the system so as to implement them according to the planning made.

In the case in point, the categories of use of the multi-function system are at least three and comprise: a category RADAR, associated to the set of the RADAR functions, a category EW associated to the set of the electronic-war functions, and a category COMM associated to the set of the communication functions that are designed to transmit/receive data/information.

Purely by way of example, a multi-function system may be able to schedule/plan and execute, preferably, but not necessarily, in a simultaneous way, a plurality of functions belonging to one and the same category RADAR, such as for example: functions of search within a volume and/or functions of search along a spatial plane, for example the horizontal plane, and/or missile warning functions, and/or missile control functions, and/or tracking-target classification functions.

In an altogether similar way, a multi-function system may be able to plan and execute, preferably, but not necessarily, in a simultaneous way, a plurality of functions belonging to one and the same category EW or COMM.

As regards, instead, the term "multi-role system", this will be understood as a phased-array system configured in such a way as to plan and execute a series of antenna functions belonging to one and the same category of use or to different categories of use.

Figure 3:
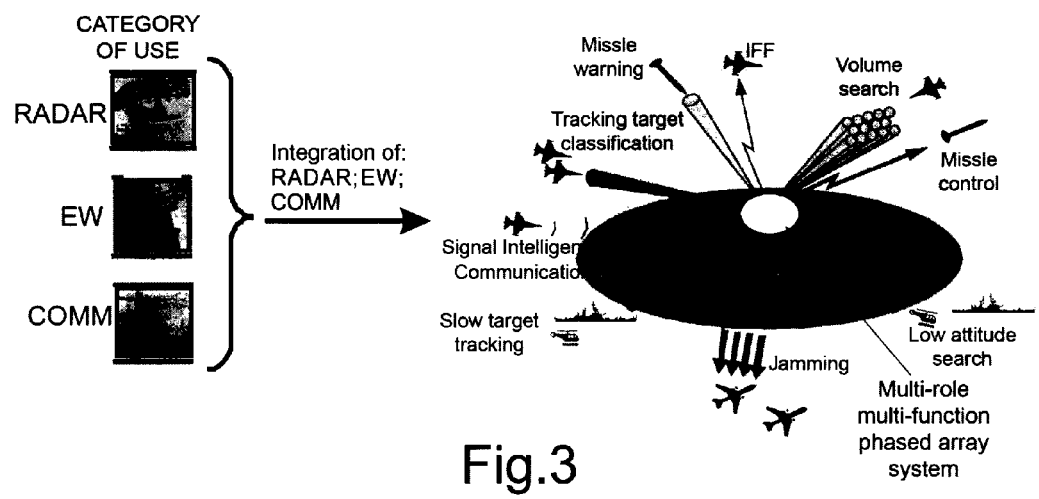
FIG. 3 is a schematic illustration of an example of the functions implemented by the multi-role phased-array system according to the present invention.

In particular, with reference to the example shown in FIG. 3, the multi-role system is configured in such a way as to plan and execute automatically, preferably, but not necessarily in a simultaneous way, one or more antenna functions comprising RADAR functions $f_{RADAR}$ belonging to the category of use RADAR, and/or one or more electronic-war functions $f_{EW}$ belonging to the category EW and/or one or more communication functions $f_{COMM}$ belonging to the category COMM.

It remains, however, evident that the categories of use of the system provided according to the present invention are not limited to the types RADAR, EW, COMM described above and shown in the example of FIG. 3, but can be preferably extended also to further categories of use designed to be implemented through an antenna system.

In addition to what has been described above, it should be pointed out that the term "resources of the system" will, instead, be understood as the set of the physical and/or virtual components, i.e., of the hardware and/or software and/or antenna and/or memory and/or data modules, and/or similar modules, used by a system to be able to execute a given antenna function belonging to one of the categories of use referred to above.

Consequently, the term "resource allocation" is to be understood as hardware and/or software and/or antenna and/or memory and/or data allocation that are used by the multi-role or multi-function phased-array system for executing one or more antenna functions.

As anticipated above, the present invention is fundamentally based on the idea of dynamic allocation of the resources used by a multi-role or multi-function system in order to execute a plurality of antenna functions during a frame interval $t_F$, in which it is basically envisaged to verify whether the resources used by the system for executing the antenna functions are allocable in the frame interval $t_F$ through a time-sharing resource allocation procedure and, if not, allocate one or more resources of the system in the frame interval $t_F$ according to an antenna-sharing resource allocation procedure and, preferably, a frequency-sharing resource allocation procedure.

In other words, the present invention is fundamentally based on the idea of providing a multi-role or multi-function system designed to perform a multi-role or multi-function and configured to perform dynamic allocation of the resources necessary for executing a plurality of antenna functions ($EFM_i$) during a frame interval of a multi-role or of a multi-function; wherein the system determines whether the antenna functions are completely executable in the frame interval, through a time-sharing resource allocation procedure, wherein it verifies whether the resources necessary for executing the antenna functions ($EFM_i$) are allocable in the frame interval ($t_F$), and in negative case, the system allocates the resources necessary for executing the antenna functions ($EFM_i$) through a time-sharing resource allocation procedure and an antenna-sharing resource allocation procedure, and frequency-sharing resource allocation procedure.

The dynamic resource allocation of the multi-role or multi-function system envisages operating according to a series of constraints-function and a series of logic conditions, described in detail, hereinafter, at least in the three different domains listed above, namely: the time domain, comprising the percentages of time that the system must dedicate to the various functions and hence the durations of execution of the activities/operations, namely the resources that are used by each antenna function and are implemented by the multi-role or multi-function system during execution of the antenna functions themselves; the space domain, comprising the set of the antennas, namely the resources, or in case of an antenna system of a phased-array type, the portions of array, i.e., the sub-arrays used during execution of the antenna functions; and the frequency domain, comprising the set of the frequencies, namely the resources to be allocated for the electromagnetic signals transmitted/received by the sub-arrays during execution of the antenna functions.

Figure 4:
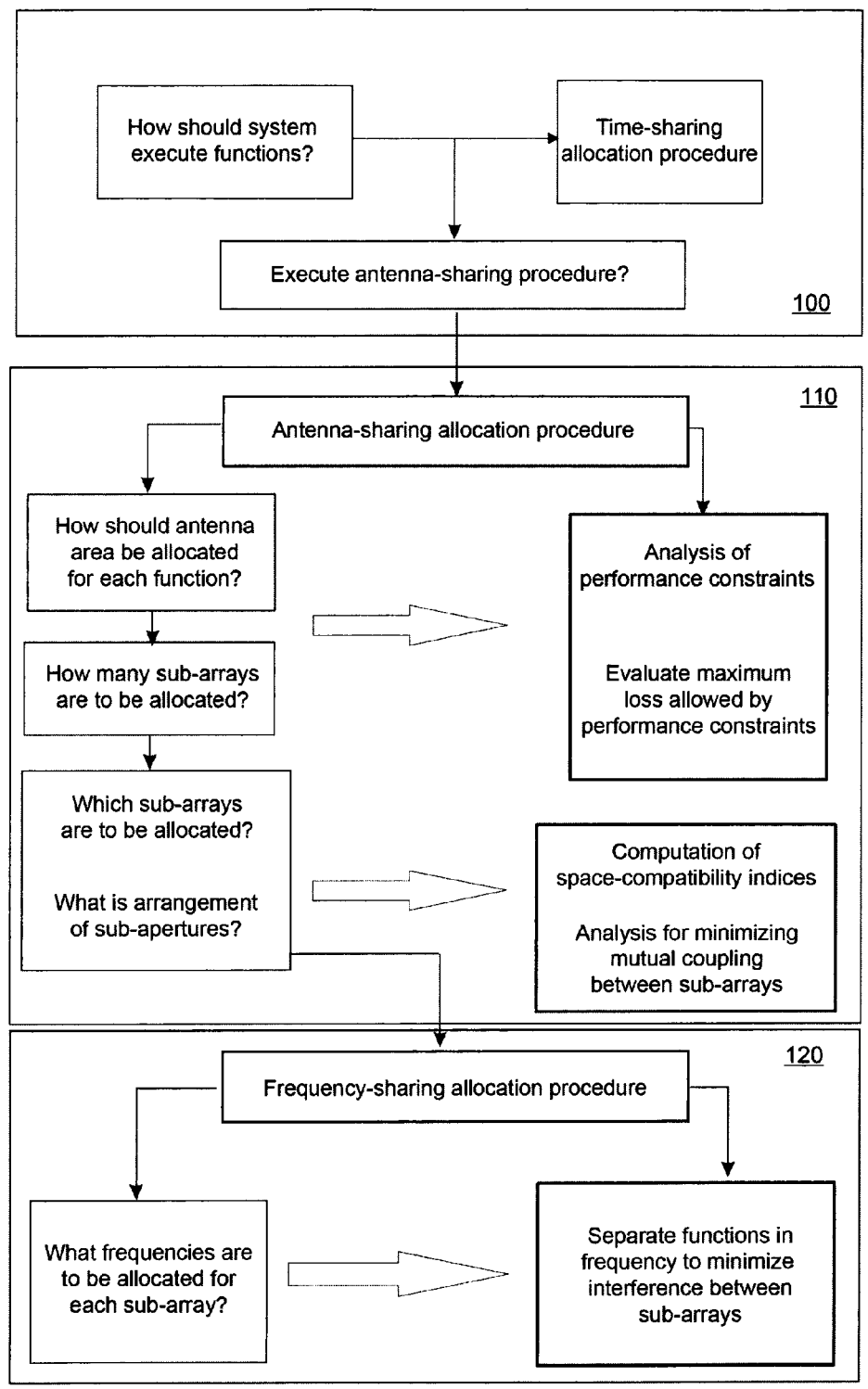
FIG. 4 shows a first flowchart of the operations of dynamic resource allocation implemented by the multi-role or multi-function phased-array system according to the present invention.

As will be explained in detail hereinafter and with reference to the flowchart shown in FIG. 4, the dynamic resource allocation comprises the time-sharing resource-allocation procedure in the time domain (block 100), where the multi-role or multi-function system verifies the possibility of executing the antenna functions, i.e. $f_{RADAR}$, and/or $f_{EW}$, and/or $f_{COMM}$ envisaged in a multi-role according to a given time sequence, where the execution of each function $f_{RADAR}$, and/or $f_{EW}$, and/or $f_{COMM}$ is made following upon completion of a previous function $f_{RADAR}$, and/or $f_{EW}$, and/or $f_{COMM}$.

The dynamic resource allocation further comprises carrying out, on the basis of the outcome of the time-sharing resource allocation procedure, an antenna-sharing resource allocation procedure (block 110), where the system allocates, for each antenna function $f_{RADAR}$ or $f_{EW}$ or $f_{COMM}$, portions of antenna aperture, i.e., the sub-apertures of the antenna system.

The dynamic resource allocation further comprises carrying out, on the basis of the outcome of the antenna-sharing resource allocation procedure, the frequency-sharing resource allocation procedure through which the system allocates one or more frequencies, i.e., one operating band for each antenna aperture or antenna sub-aperture (block 120).

Figure 5:
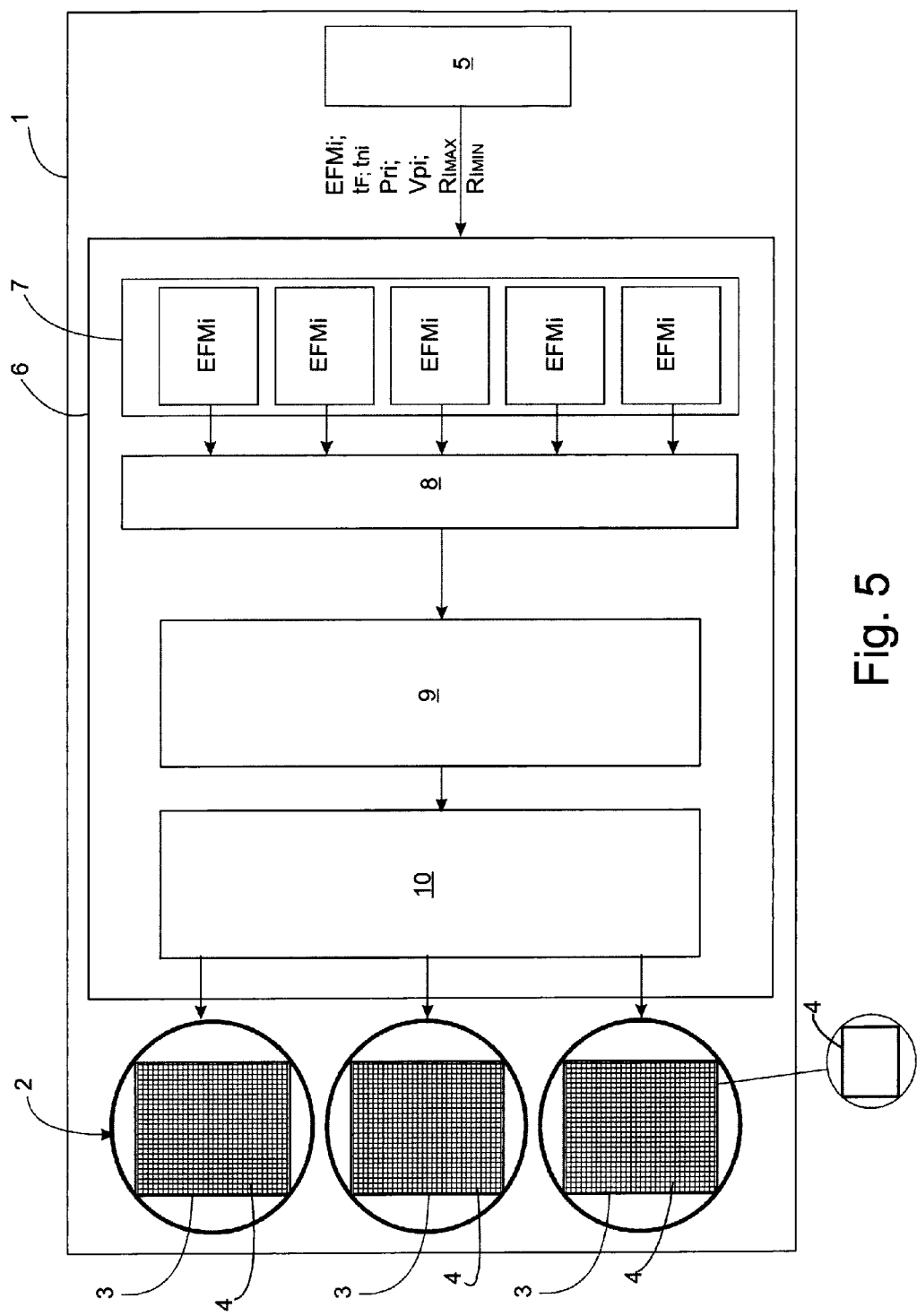
FIG. 5 shows a block diagram of the multi-role or multi-function phased-array system according to the present invention.

With reference to FIG. 5, the reference number 1 designates as a whole a multi-role or multi-function system, which is configured in such a way as to plan and execute simultaneously one or more roles or one or more functions $f_{RADAR}$ and/or $f_{EW}$ and/or $f_{COMM}$.

In the example illustrated in FIG. 5, the multi-role or multi-function system 1 is provided with one or more antenna systems 2, each of which comprises reconfigurable antennas of a phased-array type provided with an array of radiant elements 3.

Preferably, the array of radiant elements 3 has a given antenna aperture and comprises a plurality of sub-arrays 4 each having a corresponding antenna sub-aperture.

The multi-role or multi-function system 1 may moreover comprise a user-interface unit 5, and an electronic control system 6, which is provided with a function manager 7, a buffer 8, an dynamic resource allocator 9, and a function time scheduler 10.

The user-interface unit 5 can be configured to enable the user to: select/determine the antenna functions, designated hereinafter by $EFM_i$, that are to be executed during multi-function or multi-role (i ranging between 1 and n); set a frame interval $t_F$ indicating an interval within which the antenna functions $EFM_i$ must be executed and at the end of which the antenna functions $EFM_i$ must be repeated; set, for each antenna function $EFM_i$, an execution time interval tni indicating the nominal execution time within which the antenna function $EFM_i$ is to be executed; assign to each antenna function $EFM_i$ an execution priority index $Pr_i$; and assign, to each antenna function $EFM_i$, execution performance constraints $VP_i$, comprising, for example, a bit-error interval (for the function $f_{comm}$), or an antenna-coverage interval $\Delta R_i$ corresponding to the function $f_{radar}$, which could be delimited by a minimum antenna coverage constraint $R_{iMIN}$ and a maximum antenna coverage constraint $R_{iMAX}$, where $R_{iMAX} > R_{iMIN}$.

For example, the minimum antenna coverage constraint $R_{iMIN}$ may be indicative of the minimum acceptable distance within which it is possible to: detect an object, in the case of a RADAR function; and/or introduce electromagnetic disturbance or perform actively electronic-war functions, in the case of an electronic-war function; and/or receive/transmit a useful communication signal, in the case of a communication function.

As regards, instead, the maximum antenna-coverage constraint $R_{iMAX}$, it may be indicative of the optimal distance within which the system 1 operates with the maximum performance in: detecting an object, in the case of a RADAR function; and/or introducing electromagnetic disturbance or performing actively electronic-war functions, in the case of an electronic-war function; and/or transceiving a useful communication signal, in the case of a communication function.

As regards the function manager 7, it is configured in such a way as to receive at input a number of antenna function selected by the operator, and, for each active antenna, the function manager 7 activates a number of basic functions to perform such antenna function.

According to a preferred embodiment shown in FIG. 5, the function manager 7 is configured to receive the frame interval $t_F$, the antenna functions $EFM_i$ selected by the operator, the execution time intervals tni, the execution performance constraints $VP_i$ that, in the example shown in FIG. 5, comprise the coverage intervals $\Delta R_i$ of the antenna functions $EFM_i$, and the execution priority indexes $Pr_i$, and stores the information in the buffer 8.

According to an embodiment, the function manager 7 comprises a number of basic function manager operable to manage respective basic function, i.e. antenna functions. Hereinafter, to improve clarity of the present description, it will be disclosed an example of a basic function manager associated with an antenna function corresponding to a "radar search function". It should be pointed out that function managers associated with other kind of antenna function may be considered exemplifications of such specific case.

Each basic function manager may comprise a beam pointing data-base containing all pointing directions to cover a specific area o volume (horizontal scanning or volumetric scanning, etc. . . . ), and a waveform generator for any pointing direction. Waveform generator is configured to determine necessary information in a data-base containing clutter cover maps and/or jamming cover maps, and according to the cover volume to be monitored, it selects the right wave form in the wave form data-base so that to provide in output the following information which characterized the selected wave form: pulses number; PRT values; PRT stagger, burst number; frequency values; resource request generator.

Each basic function manager may supply a resources request to the dynamic resource allocator 9 and specifies a determined number of parameters such as duty time which is the percentage of time that resource is used.

Preferably, function manager mat be configured to execute BITE function and in consequence, it is able to detect resources failure.

Preferably, the resource request may be performed after selecting the wave form to be used, and in consequence the request parameters may further comprise the following information: frequencies to be used, execution priority, minimum and required execution performance to execute the specific antenna function.

In performing the resources request to the dynamic resource allocator 9, the function managers operate independently to each other, so that resources conflicts for contemporaneously executing a number of antenna functions are not managed at this level. On the contrary, resources conflicts to contemporaneously execute a number of antenna functions are solved by the dynamic resource allocator 9 which allocates resources necessary to execute antenna functions by implementing operations which will be disclosed hereinafter.

Preferably, each basic function manager may comprise a task generator outputting tasks which are supplied to the input of time scheduler 10. During tasks generation supplied to the time scheduler 10, for example, task generator may update values of parameters characterizing single tasks according to the resource allocation performed by the dynamic resource allocator 9.

As regards the dynamic resource allocator 9, it is configured so as to receive the antenna functions $EFM_i$ selected by the operator and contained in the buffer 8, the execution performance constraints $VP_i$, in particular, the coverage intervals $\Delta R_i$ of the antenna functions $EFM_i$, the execution time intervals tni, and the execution priority indexes $Pr_i$, and processes them implementing the operations envisaged by the resource-allocation method described hereinafter in such a way as to perform dynamic allocation of the resources to be assigned to each antenna function $EFM_i$.

In other words, the dynamic resource allocator 9 is configured to analyze time and space compatibility between the individual antenna functions $EFM_i$.

According to a preferred embodiment, the resources requests which are provided from each function manager and are supplied to the dynamic resource allocator 9, require to use the hardware/software of the system and specify the following parameters: duty time, frequency to be used, execution priority, minimum execution performance, required execution performance.

Preferably, the dynamic resource allocator 9 is configured to verify compatibility of the requests for the contemporary execution of a number of antenna functions and the availability of the resources (failure presences). In this way, dynamic resource allocator 9 allocates a set of "Resource Assignments" to any function manager and confirms or changes parameter values cited above.

Preferably, dynamic resource allocator 9 changes resources requests by adapting the latest to the operating system/context (graceful degradation end/or overload) and advantageously optimize execution performances of the antenna functions having highly execution priority, guaranteeing at least minimum execution performance to the other antenna function to be executed.

In other words, as will be clarified in detail hereinafter, dynamic resource allocator 9 adapts performances by considering of: temporal compatibility between requested antenna functions (sum of duty time of antenna function to be executed in a time frame has to be lower than, or equal to, 1; electromagnetic compatibility (requested frequencies have to minimize interference between antenna functions to be executed); constraints fixed by environment assessment on the selected wave forms (clutter map, jamming); constraints fixed by antenna function execution priority; and constraints fixed to guarantee minimum execution performance for any antenna function.

As regards the time scheduler 10, it is configured so as to schedule the resources previously allocated by the dynamic resource allocator 9 on the basis of the priorities and of the execution performance constraints $\Delta R_i$ and issues a command for execution of the antenna functions to the antenna system 2 according to the scheduling made.

In other words, the time scheduler 10 is configured so as to determine precisely the instant of start of execution for each activity on the basis of the execution priority thereof. It should be pointed out that the reference time frame $t_F$ used by the time scheduler 10 is altogether independent of the nominal time tni of execution of the functions/roles.

According to a preferred embodiment, time scheduler 10 is configured to schedule function tasks within a discrete execution time frame, hereinafter referred to as time frame Time frame duration, in the order of a number of ten millisecond, may be fixed previously and maintained constant during the scenario-evolution, or may dynamically vary according to real time evaluations of the scenario. Time scheduler 10 is further configured to perform algorithms operating according to task execution priority and constraints which characterized the tasks (sequential tasks).

Moreover, time scheduler 10 optimizes the tasks planning within any time frame with the purpose to minimize the empty interval and thus executing an high number of tasks.

Time scheduler 10 is further configured to manage unscheduled tasks and for this reason it supplies a feedback to a system manager (scheduling feedback not shown) which allocates unscheduled tasks to corresponding basic function managers. In detail, basic function managers generate a subsequently scheduling request according to unscheduled tasks. In this phase, execution priority of the unexecuted task is incremented to avoid that task be re-scheduled.

Figure 7:
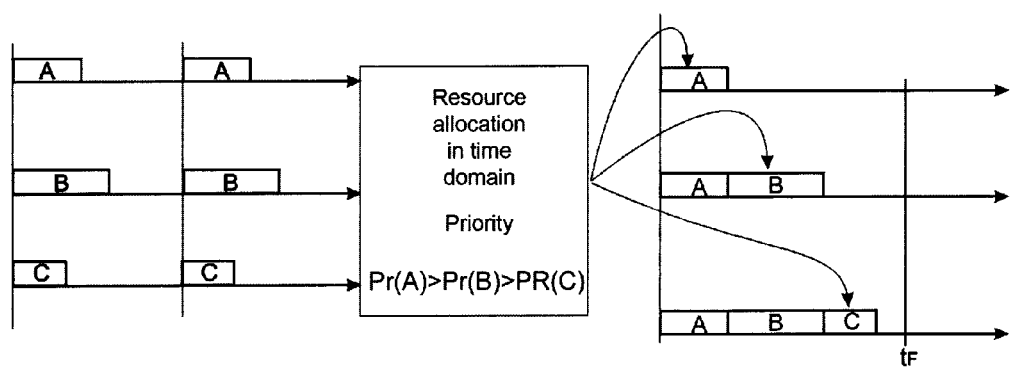
FIG. 7 is a schematic illustration of some operations of resource allocation implemented by the time-sharing resource allocation procedure.
Figure 6:
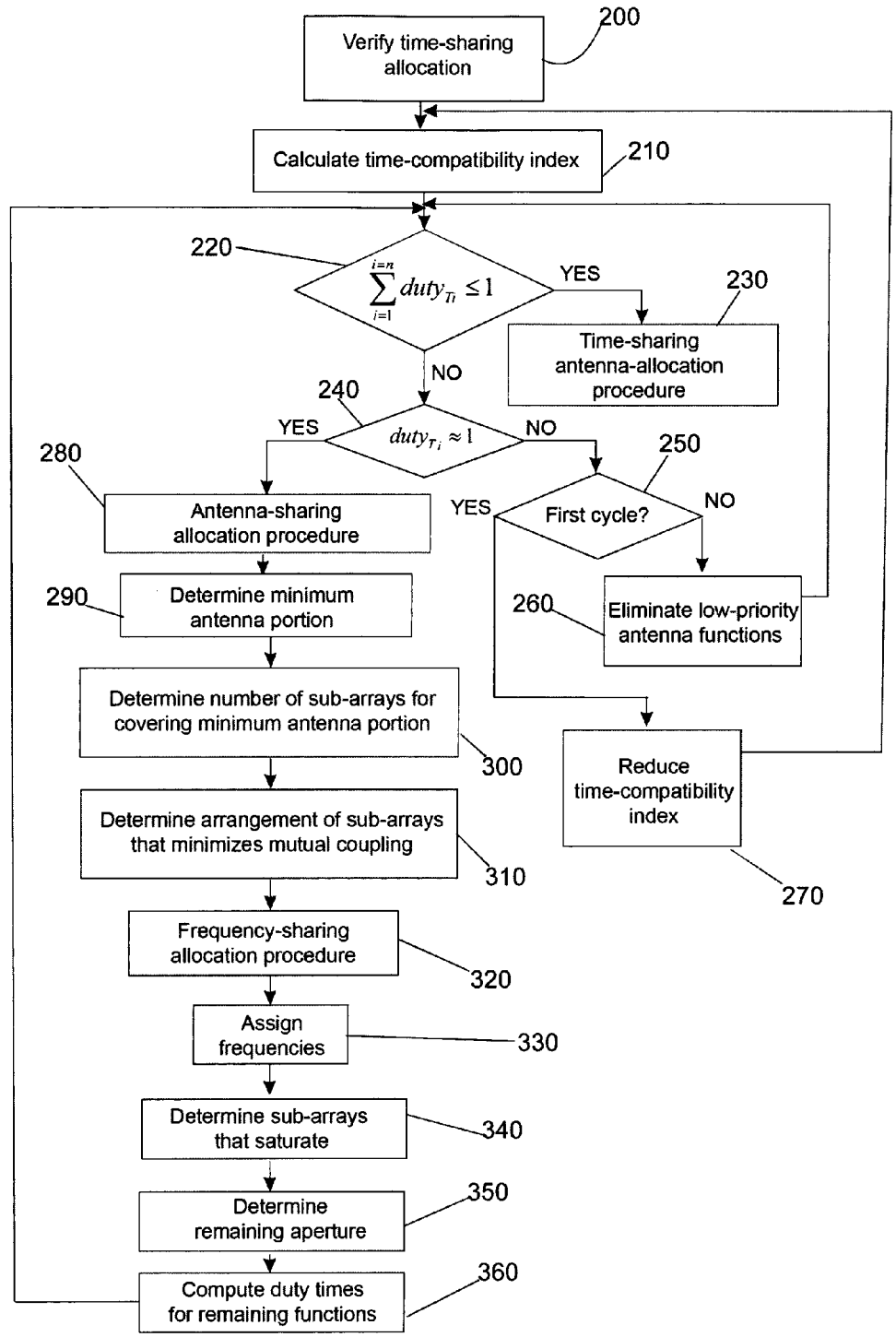
FIG. 6 shows a second flowchart of the operations of dynamic resource allocation implemented by the multi-role or multi-function phased-array system according to the present invention.

With reference to FIGS. 6 and 7 the operations implemented by the multi-role or multi-function system for dynamic allocation of the resources will be described hereinafter.

In its initial step (block 200), the multi-role or multi-function system 1 verifies whether it is possible to allocate or otherwise the resources required for execution of the antenna functions $EFM_i$ present in the buffer 8 in the time domain.

In particular, the multi-role or multi-function system 1 computes, for each antenna function $EFM_i$, which can correspond to $f_{RADAR}$, $f_{EW}$, $f_{COMM}$, a time-compatibility index $duty_{Ti}(Ai)$, which represents the percentage of time necessary for the antenna function $EFM_i$ to be executed by the multi-role or multi-function system 1 in due respect of the execution performance constraints $VP_i$ when the aperture or sub-aperture of the antenna system 2 involved during execution of the antenna function $EFM_i$ corresponds to aperture or sub-aperture, which will be indicated hereinafter with Ai.

In the initial step, i.e., in the first computation operating cycle, the method preferably assigns to each antenna function $EFM_i$ the maximum antenna aperture available $Ai=A_{MAX}$ of the antenna system 2, in particular the maximum aperture $A_{MAX}$, and computes (block 210) the duty time hereinafter indicated as time-compatibility index $duty_{Ti}$ of the function $EFM_i$ itself through the following relation:

$$duty_{Ti} = \frac{t_{EFMi}(Ai)}{t_{ni}}$$

where $t_{EFMi}(Ai)$ is the time taken by the multi-role or multi-function system 1 for implementing the function $EFM_i$ in a condition such as to satisfy the execution performance constraints $VP_i$ required when the antenna aperture available is Ai, which in the first cycle corresponds to $A_{MAX}$, whilst tni is the execution time interval indicating the nominal execution time within which the antenna function $EFM_i$ is to be executed.

In the case in point, in this step, $t_{EFMi}(Ai)$ is the time taken by the multi-role or multi-function system 1 for implementing the function $EFM_i$ in a condition such as to satisfy the maximum antenna-coverage constraint $R_{iMAX}$.

Following upon calculation of the time-compatibility index $duty_{Ti}$ of n functions $EFM_i$ the multi-role or multi-function system 1 verifies whether the sum of the time-compatibility indexes $duty_{Ti}$ of the n functions $EFM_i$ present in the buffer 8 is lower than or equal to unity (block 220)

$$\sum_{i=1}^{i=n} duty_{Ti} \leq 1$$

In the case of positive outcome (output YES from block 220), i.e., if the sum of the time-compatibility indexes $duty_{Ti}$ of the n functions $EFM_i$ present in the buffer 8 is lower than or equal to unity, the multi-role or multi-function system 1 ascertains the possibility of allocating completely the resources in the time domain, implementing a time-sharing resource allocation procedure (block 230).

In detail, the time-sharing resource allocation procedure schedules execution of the functions $EFM_i$ according to an orderly time sequence where the instants of execution of the functions are established as a function of the corresponding execution priority indexes $Pr_i$. With reference to the example shown in FIG. 7, the time-sharing resource allocation procedure allocates the functions $EFM_i$ giving precedence to the functions $EFM_i$ having a higher execution priority index.

In the case of negative outcome (output NO from block 220), i.e., if the sum of the time-compatibility indexes $duty_{Ti}$ of the n antenna functions $EFM_i$ present in the buffer 8 is greater than unity, the multi-role or multi-function system 1 verifies whether there are antenna functions $EFM_i$ having a time-compatibility index approximately equal to unity, $duty_{Ti} \approx 1$ (block 240).

In the case of negative outcome (output NO from block 240), i.e., if none of the functions $EFM_i$ has a time-compatibility index approximately equal to unity, $duty_{Ti} \approx 1$, the multi-role or multi-function system 1 verifies whether the cycle of calculation in progress corresponds to the first cycle (block 250) and, if it does (output YES from block 250), reduces the time-compatibility indexes $duty_{Ti}$ of the antenna functions $EFM_i$ with low execution priority indexes $Pr_i$, i.e., lower than or equal to a minimum pre-set priority threshold $SMPr_i$; $Pr_i <= SMPr_i$ (block 260).

In particular, the multi-role or multi-function system 1 carries out, starting from the antenna functions $EFM_i$ having execution priority indexes lower than or equal to a minimum pre-set execution priority threshold $SMPr_i$, a reduction of the execution times $t_{EFMi}(Ai)$ until an execution time $t_{EFMimin}(Ai)$ is reached within which the required limits of performance $VP_i$ of the antenna function $EFM_i$ are satisfied.

In this step, the multi-role or multi-function system 1 modifies the execution time $t_{EFMi}(Ai)$ of one or more antenna functions $EFM_i$ having the minimum execution priority index $Pr_i$ so that the respective antenna coverages satisfy the corresponding minimum-coverage constraint $R_{iMIN}$.

Following upon modification of the execution time/times $t_{EFMi}(Ai)$, the multi-role or multi-function system 1 recomputes the time-compatibility indexes $duty_{Ti}$ (block 210) and verifies again whether the sum of the time-compatibility indexes $duty_{Ti}$ of the n functions $EFM_i$ present in the buffer 8 is lower than or equal to unity (block 220).

If the sum of the time-compatibility indexes $duty_{Ti}$ of the n functions $EFM_i$ present in the buffer 8 is lower than or equal to unity (output YES from block 220), the multi-role or multi-function system 1 implements the time-sharing resource allocation procedure referred to above (block 230), whilst otherwise (output NO from block 220), i.e., if following upon reduction of the execution times $t_{EFMi}(Ai)$ described above the summation of the time-compatibility indexes $duty_{Ti}$ remains still greater than unity, the multi-role or multi-function system 1 again carries out the operations of blocks 240 and 250 and, since the cycle does not corresponds to the first (output NO from block 250), eliminates from the buffer 8 at least one function $EFM_i$ having an execution priority index lower than or equal to the minimum pre-set execution priority threshold $SMPr_i$ (block 270).

At this point the multi-role or multi-function system 1 verifies again whether the sum of the time-compatibility indexes $duty_{Ti}$ of the remaining n=n−k antenna functions $EFM_i$ present in the buffer 8 (where k corresponds to the number of antenna functions eliminated) is lower than or equal to unity (block 220) and, if it is, implements the time-sharing resource allocation procedure indicated above, whereas otherwise it implements again the operations described in blocks 240, 270, i.e., it eliminates from the buffer 8 one or more functions $EFM_i$ having an execution priority index lower than or equal to the minimum pre-set execution priority threshold $SMPr_i$.

If at least one of the antenna functions $EFM_i$ has a time-compatibility index approximately equal to unity $duty_{Ti} \approx 1$ (output YES from block 240) (in the example shown it is assumed, without this implying any loss in generality, that the antenna function $EFM_i^*$ has a $duty_{Ti} \approx 1$), the multi-role or multi-function system 1 implements an antenna-sharing resource allocation procedure (block 280), which envisages causing the antenna function $EFM_i^*$ to be executed simultaneously to other antenna functions $EFM_i$ thus sharing the time domain of the latter, but using an antenna portion different from the portions used thereby.

In particular, the antenna-sharing resource allocation procedure computes the size of the minimum antenna area $Ai_{min}$ necessary for the execution performance constraints $VP_i$ of the antenna function $EFM_i^*$ to be satisfied (block 290).

Figure 8:
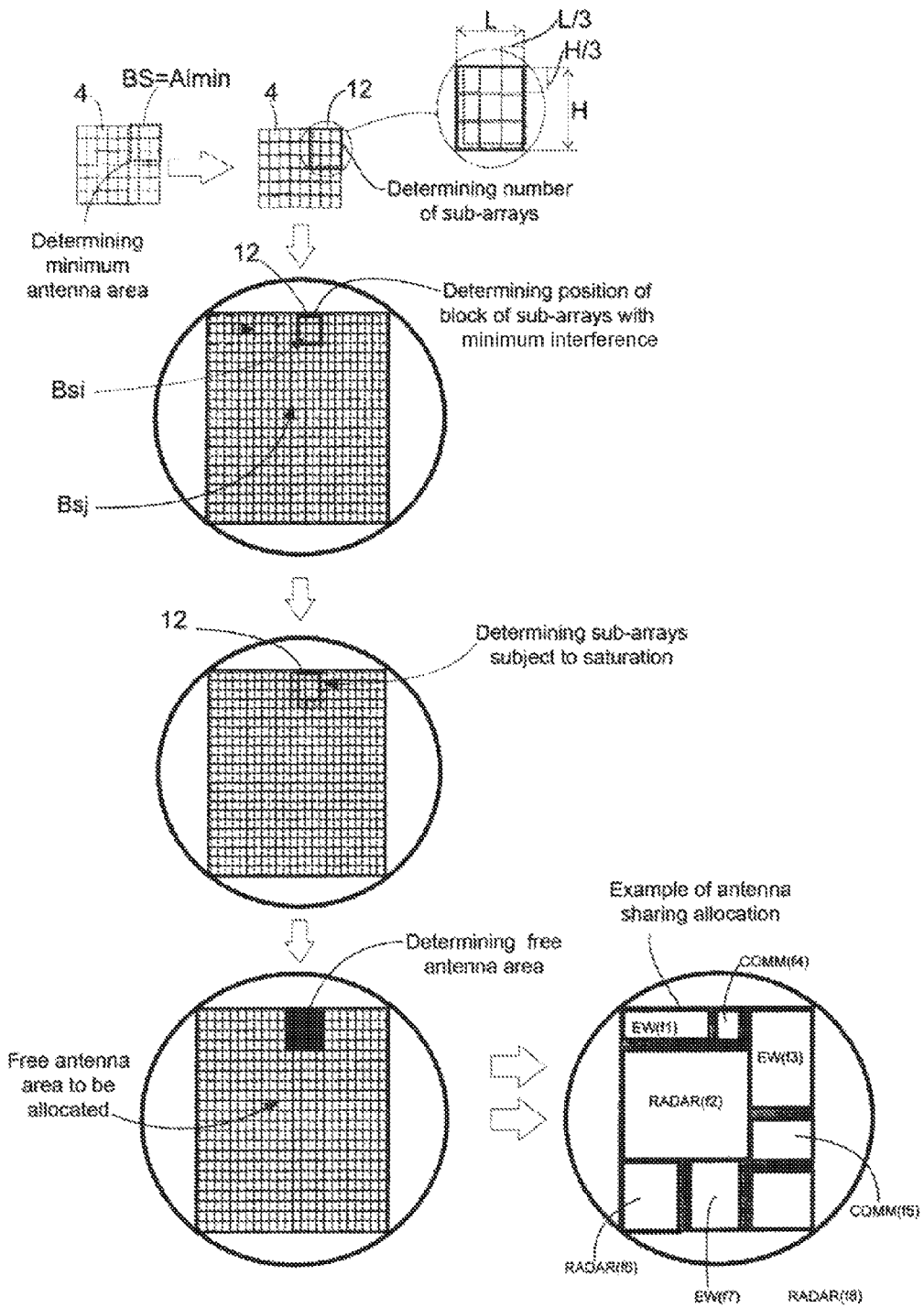
FIG. 8 shows a schematic example of the operations of the antenna-sharing resource allocation procedure used in the method according to the present invention.

In the example illustrated, the multi-role or multi-function system 1 determines the size of the minimum antenna area $Ai_{min}$ corresponding, for example, to an prearranged aperture portion BS (FIG. 8).

At this point, the multi-role or multi-function system 1 determines an optimal configuration of sub-arrays 4 forming a multiple block of sub-arrays 12 having as a whole an aperture portion BS (block 300) (FIG. 8).

In particular, the multi-role or multi-function system 1 determines the number $N_{sub}$ of sub-arrays 4, each having a sub-aperture $Bs_i$, which is necessary for covering the aperture portion BS (N*Bsi=BS).

The multi-role or multi-function system 1 is configured in such a way as to approximate by excess the number $N_{sub}$ of sub-arrays 4 necessary for the sum of the sub-apertures $Bs_i$ thereof to correspond to the minimum antenna area $Ai_{min}$, i.e., to the aperture portion BS provided by the multiple block of sub-arrays 12.

With reference to FIG. 8, merely by way of example and in order to clarify determination of the number of sub-arrays 4 contained in the multiple block of sub-arrays 12, if the aperture portion BS necessary to satisfy the execution performance constraints $VP_i$ during execution of the antenna function $EFM_i$ has a substantially rectangular shape with a height H and a width L and each sub-array 4 also has a substantially rectangular shape with a height H/3 and a width L/3, the multi-role or multi-function system 1 determines that the coverage of the antenna area Ai can be obtained via the use of nine sub-arrays 4 set alongside one another in sets of three.

At this point, the multi-role or multi-function system 1 determines the optimal position to be assigned to the multiple block of sub-arrays 12 within the array of radiant elements 3.

In this step, the multi-role or multi-function system 1 identifies the set of the multiple blocks of sub-arrays 12 comprising $N_{sub}$ sub-arrays 4 within the array of radiant elements 3 and determines, for each of the multiple blocks of sub-arrays 12 contained in the set, a corresponding space-compatibility index $SCI_{i,j \ldots fk}(Bsi, Bsj)$.

In the case in point, in this step the multi-role or multi-function system 1 excludes from the array any possible portions of area assigned to other antenna functions and determines the set of the multiple blocks of sub-arrays 12 contained within the remaining "free" portion of area of the array itself (block 310).

In detail, the space-compatibility index $SCI_{i,j\ldots fk}(Bsi, Bsj)$ indicates a mutual interference present between the electromagnetic signals STX transmitted by the radiant elements 3 of the multiple block of sub-arrays 12 having the sub-aperture $Bs_i$ and the electromagnetic signals SRX received by the remaining radiant elements present in the array 4 and having an aperture Bsj=A−Bsi equal to the difference between the overall aperture of the array and the sub-aperture Bsi.

In particular, the multi-role or multi-function system 1 computes the space-compatibility index $SCI_{i,j\ldots fk}(Bsi,Bsj)$ as follows $$SCI_{i,j,i,jk}(Bsi, Bsj) = \frac{P_{RX}(Bsj)}{P_{TX}(Bsi, fk)}$$

where, in general, $P_{RX}(Bsj)$ is the interfering power received by the aperture BSj due to the simultaneous transmission of a power $P_{TX}(Bsi,fk)$ by the sub-aperture $Bs_i$ of the multiple block of sub-arrays 12 at a pre-set transmission frequency $f_k$.

The multi-role or multi-function system 1 identifies the multiple block of sub-arrays 12 having the minimum space-compatibility index $SCI_{i,j\ldots fk}(Bsi,Bsj)$ in the set of the multiple blocks of sub-arrays 12 and allocates it for execution of the antenna function $EFM_i$.

At this point, the multi-role or multi-function system 1 implements a frequency-sharing resource allocation procedure (block 320), which envisages determining the frequency to be assigned to the electromagnetic signals transmitted and/or received by the multiple block of sub-arrays 12 determined in the previous step.

In particular, the assignment of the frequency to the electromagnetic signals transmitted and/or received by the multiple block of sub-arrays 12 determined in the previous step is carried out in such a way as to space apart as much as possible the transmission frequencies used by the block itself from the frequencies of reception of electromagnetic signals used by other antenna functions in the same execution time interval of the function $EFM_i^*$.

Following upon allocation of the frequency to the multiple block of sub-arrays 12 associated to the antenna function $EFM_i^*$, the multi-role or multi-function system 1 determines the sub-arrays 4 of the array of radiant elements 3 that are saturated by the electromagnetic signals generated by the multiple block of sub-arrays 12 determined in the previous step (block 340).

The multi-role or multi-function system 1 disables the sub-arrays 4 that have undergone saturation, determined in the previous step, in such a way as to eliminate them from the aperture of the antenna system 2, i.e., in such a way as not to make them available for execution of other antenna functions.

At this point, the multi-role or multi-function system 1 determines the antenna portion of the antenna system 2 remaining available for allocation of the remaining antenna functions (block 350). In particular, the antenna portion of the antenna system 2 remaining available is calculated, eliminating from the aperture the antenna portions assigned and the sub-arrays that have undergone saturation.

The multi-role or multi-function system 1 computes again the time-compatibility indexes of the antenna functions to be allocated and repeats again the operations described in blocks 200-360.

In the case in point, in this step the method decrements the index n=n−1, and verifies whether it is possible or otherwise to allocate the n−1 antenna functions $EFM_i$ through the time-sharing resource allocation procedure, considering the availability of the free antenna portion.

If it is not possible, the multi-role or multi-function system 1 re-iterates the operations described in blocks 210-270, carrying out a reduction of the time-compatibility index and/or eliminating the antenna functions with low execution priorities according to what has been described above. In the case where other antenna functions $EFM_i$ are present having a time-compatibility index approximately equal to unity, the multi-role or multi-function system 1 implements the antenna-sharing resource allocation procedure (blocks 240-360) on the free antenna portion and the frequency-sharing resource allocation procedure on the basis of the free frequencies available.

The operations described above and listed in FIGS. 4 and 6 can be encoded in a computer program that can be loaded into the multi-role or multi-function system 1 and is configured to enable, when run, the multi-role or multi-function system 1 to carry out the operations described above and shown in the blocks represented in FIGS. 4 and 6.

In view of what has been described above, it should be pointed out that, according to a different embodiment, the antenna system 2 of the multi-role or multi-function system 1, as an alternative to the reconfigurable phased-array antennas, can comprise a plurality of single antennas distinct and separate from one another, arranged, that is, at pre-set distances from one another, each of which is configured for performing a pre-established set of functions/roles.

In this case, the dynamic resource allocation envisages carrying out (in a way similar to the case of the operations described in FIGS. 4 and 6), on the basis of the outcome of the time-sharing resource allocation procedure, the antenna-sharing resource allocation procedure, where the multi-role or multi-function system 1, in a way similar to what has been described previously, allocates the sub-arrays within the antenna aperture dedicated to execution of the function of interest.

In particular, following upon calculation of the size of the minimum antenna aperture BS necessary for the execution performance constraints $VP_i$ of the antenna function $EFM_i^*$ to be satisfied, the multi-role or multi-function system 1 determines an optimal configuration of the set of sub-arrays having as a whole the aperture portion BS within the antenna aperture of interest.

The dynamic resource allocation further comprises carrying out, on the basis of the outcome of the antenna-sharing resource allocation procedure, the frequency-sharing resource allocation procedure, through which the system allocates a given frequency to each function.

The method described above is extremely advantageous in so far as it plans in an altogether automatic way the resources of the multi-role or multi-function phased-array system in order to share them, thus obtaining an optimization thereof.

The invention claimed is:

1. A multi-role or multi-function system operable to perform a multi-role or a multi-function and configured to dynamically allocate requisite resources for performing antenna functions during a frame interval of the multi-role or the multi-function by:
   determining whether the antenna functions are completely performable in the frame interval, based on a time-sharing resource allocation procedure;

if not, allocate the requisite resources for performing the antenna functions during the frame interval, based on a time-sharing resource allocation procedure and an antenna-sharing resource allocation procedure; and performing, based on the time-sharing resource allocation procedure, the antenna-sharing resource allocation procedure, by means of which one or more antenna aperture or sub-aperture areas are allocated to each main antenna function.

2. The system of claim 1, further configured to:

determine whether the antenna functions are completely performable in the frame interval, based on a time-sharing resource allocation procedure; and if not, allocate the requisite resources for performing the antenna functions during the frame interval, based on a time-sharing resource allocation procedure, an antenna-sharing resource allocation procedure, and a frequency-sharing resource allocation procedure.

3. The system of claim 1, comprising:

a dynamic resource allocator configured to:
    receive data indicative of antenna functions to be performed, associated execution performance constraints, associated execution time intervals and associated execution priority indexes;
    verify, based on the received data, whether the antenna functions are completely performable in the frame interval based on a time-sharing resource allocation procedure, and, if not, allocate the requisite resources for performing the antenna functions during the frame interval based on a time-sharing resource allocation procedure and an antenna-sharing resource allocation procedure; and a time scheduler configured to determine a time sequence of the antenna functions to be performed based on the resource allocation made by the dynamic resource allocator.

4. The system of claim 1, further configured to perform, based on the outcome of the antenna-sharing resource allocation procedure, the frequency-sharing resource allocation procedure, by means of which one or more frequencies are allocated to each antenna aperture or sub-aperture area.

5. The system of claim 1, further configured to:

receive, for each antenna function, at least one execution performance constraint on the execution of the antenna function;

receive, for each antenna function, a nominal execution time interval;

receive, for each antenna function, at least one execution priority index;

determine, for each antenna function, a time-compatibility index indicative of a percentage of effective time of execution of the antenna function with respect to the nominal execution time interval during which the execution performance constraint is satisfied;

verify whether the time-compatibility indexes of the antenna functions satisfy a first pre-set relation; and if the first relation is satisfied, allocate the requisite resources for executing the antenna functions in the frame interval according to a time sequence determined based on the execution priority indexes.

6. The system of claim 5, further configured to compute a time-compatibility index based on the following formula:

$$duty_{Ti} = \frac{t_{EFMi}(Ai)}{t_{ni}}$$

where $t_{EFMi}(Ai)$ is the effective time of execution taken by the multi-role or multi-function system for implementing an antenna function to satisfy the execution performance constraints required when the antenna aperture is Ai and $t_{ni}$ is the nominal execution time interval for the antenna function.

7. The system of claim 5, further configured to, when the first relation is not satisfied:

assign to the effective execution time of at least one antenna function with an execution priority index lower than a pre-set execution priority threshold, a minimum value such that the execution performance constraint on the antenna function may be satisfied;

re-compute the time-compatibility indexes of the antenna functions based on the minimum value assigned to the antenna function;

verify whether the re-computed time-compatibility indexes of the antenna functions satisfy the first relation; and if the first relation is satisfied, determine that the requisite resources for performing the antenna functions are allocatable in the frame interval, and allocating the requisite resources for executing the antenna functions in the frame interval according to a time sequence based on the execution priority indexes.

8. The system of claim 5, further configured to, when the first relation duty is not satisfied:

remove one or more antenna functions with execution priority indexes lower than a pre-set execution priority threshold;

re-compute the time-compatibility indexes of the remaining antenna functions;

verify whether the re-computed time-compatibility indexes of the antenna functions ($EFM_i$) satisfy the first relation; and if the first relation is satisfied, allocate the requisite resources for executing the remaining antenna functions in the frame interval according to a time sequence based on the execution priority indexes.

9. The system of claim 1, further configured to, when the antenna functions are determined not to be completely performable in the frame interval based on a time-sharing resource allocation procedure:

determine main antenna functions with time-compatibility indexes approximately equal to unity; and allocate the requisite resources for executing the main antenna functions according to the antenna-sharing resource allocation procedure.

10. The system of claim 9, further comprising at least one antenna system and configured to implement the antenna-sharing resource allocation procedure by:

computing, for each main antenna function, a minimum antenna aperture necessary for causing the execution performance constraint on the main antenna function to be satisfied; and determining a configuration of the antenna system having as a whole an antenna aperture equal to the computed minimum antenna aperture.

11. The system of claim 10, wherein each antenna system comprises a phased-array antenna including one or more arrays of radiant elements; each array of radiant elements having a given antenna aperture and comprising a plurality of sub-arrays each having an antenna sub-aperture;

wherein the system is further configured to implement the antenna-sharing resource allocation procedure by:

determining, for each main antenna function, an optimal configuration of sub-arrays forming a multiple block of sub-arrays having as a whole an aperture portion having dimensions equal to the minimum antenna area necessary for causing the execution performance constraint on the main antenna function to be satisfied; and determining the location to be assigned to the multiple block of sub-arrays within the array of radiant elements based on a mutual interference index.

12. The system of claim 10, wherein each antenna system comprises a plurality of distinct antennas;

wherein the system is further configured to implement the antenna-sharing resource allocation procedure by:

determining, for each main antenna function, an optimal configuration of the antennas having as a whole the aperture portion necessary for causing the execution performance constraint on the main antenna function to be satisfied.

13. The system of claim 11, further configured to implement the antenna-sharing resource allocation procedure by:

disabling from the array of radiant elements those sub-arrays that have undergone saturation caused by the electromagnetic signals emitted by the multiple block of sub-arrays; and determining the free antenna area present in the array of radiant elements based on the allocated multiple blocks of sub-arrays and on the sub-arrays that have undergone saturation.

14. The system of claim 13, further configured to implement the antenna-sharing resource allocation procedure by:

computing a space-compatibility index indicating a mutual interference between electromagnetic signals transmitted by the radiant elements of the multiple block of sub-arrays that has a minimum aperture and electromagnetic signals received by the remaining radiant elements in the free antenna area in the array of radiant elements and having an aperture equal to the difference between the overall free aperture of the array of radiant elements and the minimum aperture.

15. The system according to claim 14, further configured to implement the antenna-sharing resource allocation procedure by:

computing the space-compatibility index based on the following formula:

$$SCI_{i,j,i,jk}(Bs_i, Bs_j) = \frac{P_{RX}(Bsj)}{P_{TX}(Bs_i, fk)}$$

where $P_{RX}(Bsj)$ is a received free aperture interfering power due to the simultaneous transmission of a power $P_{TX}(Bs_i, fk)$ by the sub-aperture $Bs_i$ of the multiple block of sub-arrays at a pre-set transmission frequency $f_k$.

16. The system of claim 15, configured to implement the antenna-sharing resource allocation procedure by:

identifying the multiple block of sub-arrays having the minimum space-compatibility index in the set of the multiple blocks of sub-arrays; and allocating the identified multiple block of sub-arrays for executing the main antenna function.

17. The system of claim 16, further configured to implement the frequency-sharing resource allocation procedure for the main antenna function by:

assigning to electromagnetic signals transmitted by the multiple block of sub-arrays a frequency having a maximum deviation with respect to receiving frequencies of electromagnetic signals used by other antenna functions in the same execution time interval of the main antenna function.

18. A method of dynamically allocating requisite resources for performing antenna functions during a frame interval of the multi-role or the multi-function performed by a multi-role or multi-function system;

the method being characterized by:

determining whether the antenna functions are completely performable in the frame interval, based on a time-sharing resource allocation procedure;

if not, allocate the requisite resources for performing the antenna functions during the frame interval based on a time-sharing resource allocation procedure and an antenna-sharing resource allocation procedure; and performing, based on the time-sharing resource allocation procedure, the antenna-sharing resource allocation procedure, by means of which one or more antenna aperture or sub-aperture areas are allocated to each main antenna function.

19. The method of claim 18, further comprising:

determining whether the antenna functions are completely performable in the frame interval, based on a time-sharing resource allocation procedure; and if not, allocate the requisite resources for performing the antenna functions during the frame interval, based on a time-sharing resource allocation procedure, an antenna-sharing resource allocation procedure, and a frequency-sharing resource allocation procedure.

20. Software loadable in a multi-role or multi-function system and designed to cause, when executed, the multi-role or multi-function system to become configured as claimed in claim 1.

* * * * *